Figure 3:
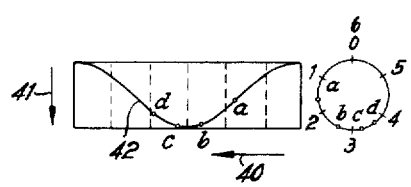

June 24, 1958        K. KECK        2,840,207
OVERLOAD SAFETY DEVICE FOR POWER MACHINE TOOLS
Filed Aug. 24, 1953        2 Sheets-Sheet 1
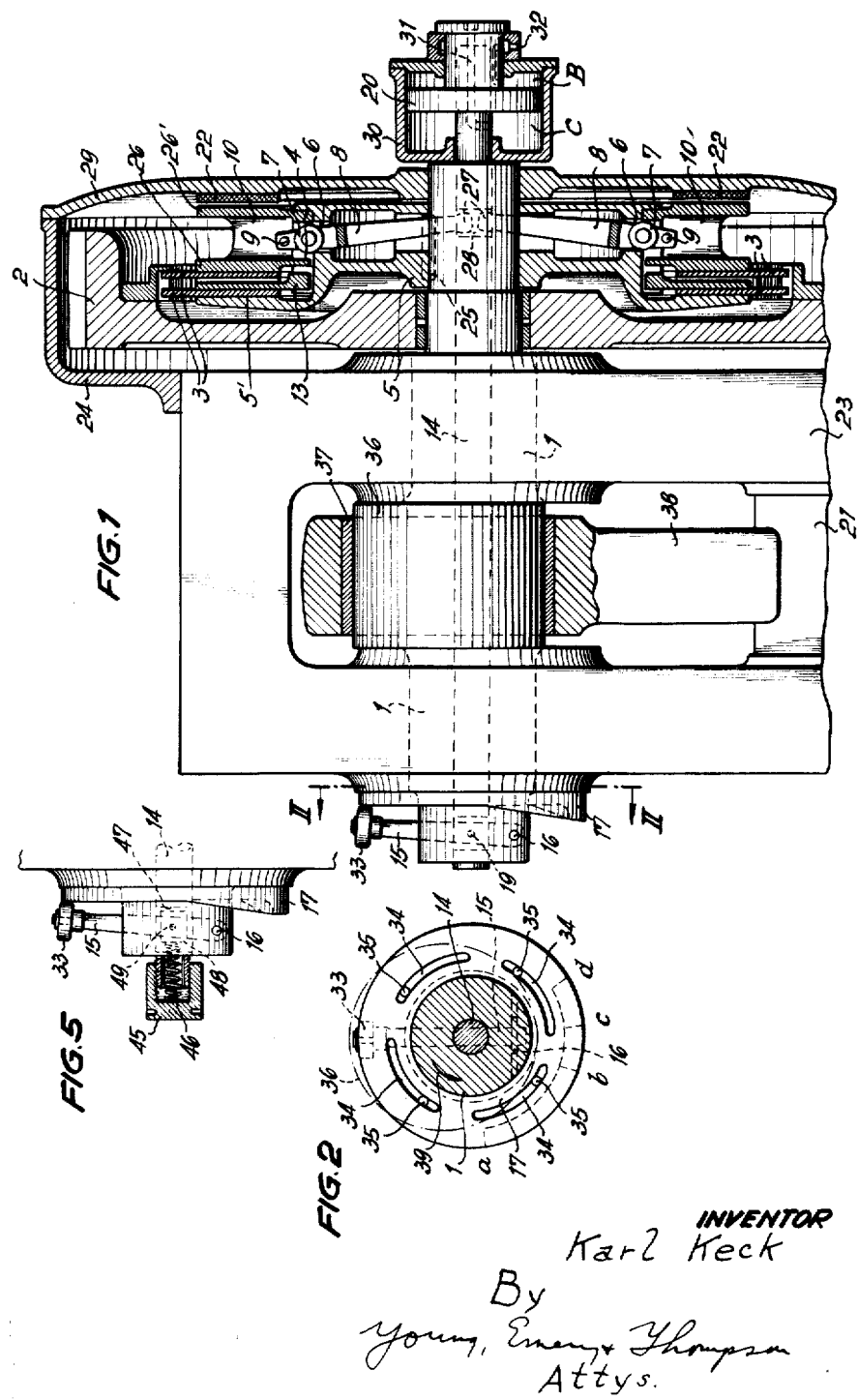
INVENTOR
Karl Keck June 24, 1958 K. KECK 2,840,207
OVERLOAD SAFETY DEVICE FOR POWER MACHINE TOOLS
Filed Aug. 24, 1953 2 Sheets-Sheet 2

INVENTOR
Karl Keck
By
Young, Emery & Thompson
Attys.

United States Patent Office 2,840,207
Patented June 24, 1958

2,840,207

OVERLOAD SAFETY DEVICE FOR POWER MACHINE TOOLS

Karl Keck, Goppingen, Germany, assignor to L. Schuler A. G., Goppingen, Wurttemberg, Germany Application August 24, 1953, Serial No. 376,206

Claims priority, application Germany September 2, 1952

7 Claims. (Cl. 192—69)

This invention relates to power operated machines such as presses, shearing and punching machines, and the like which are driven through a coupling and provided with overload safety means.

In such machines the force exerted on the tool is dependent on the "work" angle, the angle between the tangential force exerted by the drive shaft for the tool, for example a crankshaft or an eccentric shaft, and the force acting on the tool. This force is greater the nearer the tool approaches the lower reversal point. Accordingly, with constant torque on the drive shaft for the tool the force exerted thereon in the down stroke of the ram is always greater and attains its maximum at the lower reversal point, and the danger of overload therefore is greatest in the lower part of said stroke.

Machines of this kind are provided with overload safety means designed to come into operation when the force acting on the tool reaches a predetermined magnitude, depending on the nature of the safety means and the material being worked. According to the present invention the coupling is constructed to act also as overload safety means, whereby a separate device for this purpose becomes unnecessary. As a further object of the invention the torque which the coupling is capable of transmitting, preferably through members actuated by the machine itself, is controllable during operation, for example in such a manner that, in the case of a friction coupling, the contact pressure between the coupling elements can be varied by means of a cam disc. The force on the tool can then be set at a selected maximum permissible magnitude which may remain constant during the entire downstroke of the tool. Also from the desired force on the ram, taking into consideration the work angle, the corresponding tangential force and torque can be determined. The control means can then be adapted to this torque. A greater torque cannot be transmitted because the coupling, in case of an overload, will operate as a safety means, that is, in the case of a friction coupling, will slip. In machines so equipped according to this invention it is not possible, as in prior machines with separate overload safety means such as rupture elements, for overload to occur before the safety means come into action, said separate safety means operating with retardation.

In one construction according to the invention employing a friction coupling there is provided a pressure piston the force exerted by which when the coupling is engaged can be varied in the course of a working cycle by means of a cam disc. The coupling may be a plate coupling, arranged on a hollow shaft, preferably the main drive shaft of the tool, inside which is guided a control rod for the coupling having mounted thereon the pressure piston which co-operates with the cam disc through a lever.

Figure 4:
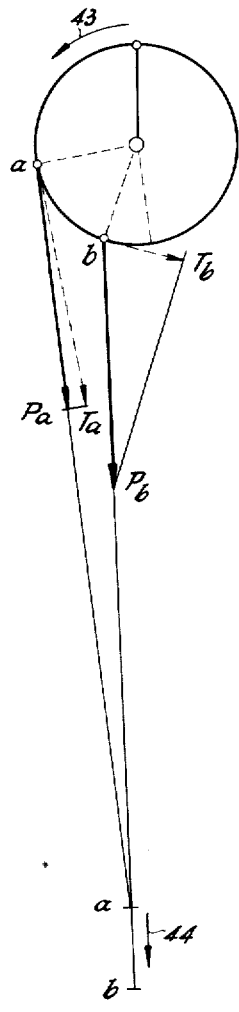
Figure 6:
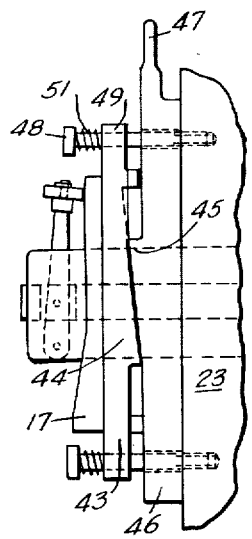

These and other features of the invention will be better understood from the following description and the accompanying drawings, in which:

Fig. 1 is an elevation, partly in section, of an eccentric press having the invention applied thereto, Fig. 2 is a cross section taken on line II—II of Fig. 1 in the direction of the arrows, Fig. 3 is a diagram explanatory of the operation of the machine of Figs. 1 and 2, Fig. 4 is a force diagram, Fig. 5 is a detail, partly in section, of a modified structure, and Fig. 6 is a side elevation of a detail.

The eccentric driven press shown in Fig. 1 has its driving eccentric shaft 1 journalled in an upper frame portion 23 and having a drive wheel 2 rotatable thereon, which wheel carries two friction rings 3, and constitutes one unit of a disc coupling arranged in a casing 24. On the shaft 1 there is secured, by means of a key 25, a coupling disc carrier 5, the rim portion 5' of which supports coupling discs, the carrier 5 having thereon a ring of teeth 4. The carrier has slots 6 therein through which extend levers 8, one end of each of said levers being pivoted at 9 to a plate support 10 which is slidable parallel to the eccentric shaft in the teeth 4 of the plate carrier disc 5 and which carries two coupling discs 26 and 26'. At their other end, the levers 8 have heads which extend into a bore 28 in a coupling control or operating rod 14 which is axially slidable in the bore of the hollow eccentric shaft 1. The levers 8 also have rolls 7 thereon which engage in the slots 6 and about which they can rock. In addition to the coupling plates 26 and 26' connected to the support 10, there is provided a slidable coupling plate 13 mounted on the toothed crown 4, which in the coupled position presses the friction ring 3 adjacent the carrier disc 5' against the disc 5' and in the uncoupled position between the two friction discs 3. On rocking the levers 8 the plate support 10 and coupling plates 13, 26, and 26' are shifted along the teeth 4 of said disc 5, that is, parallel to the eccentric shaft. A shift to the left, Fig. 1 causes the parts 10, 13, and 26 forming the other coupling unit to press against the friction rings 3 to engage the coupling, while, a shift to the right causes the discs 26' to press against a brake lining 22 on the cover 29 of the housing 24, this being the braking position.

The right hand end of the rod 14, Fig. 1, extends into a cylinder 30 in which a pressure piston 20 operates to which the rod is connected. The rod, at this end, has a bore 31 terminating in a coupling chamber C of the cylinder 30, to the other end of which bore is connected a pipe from which the chamber C can be supplied with a liquid, such as oil, under pressure. A further pipe is connected to a bore 32 leading to a braking chamber B in the cylinder. The left hand end of the control rod 14 has a lever 15 pivoted to it at 19 which lever is pivoted at 16 to the eccentric shaft 1 inside the same so that it rotates therewith. At its outer end the lever 15 carries a roll 33 which when the shaft 1 rotates, entraining the lever 15, runs on a cam profile member mounted on the frame part 23, (not shown to scale). The cam member is rotatable and can be secured in a desired position of rotation by means not shown, for which purpose pins 35 extend from the frame part 23 through arcuate slots in said member as shown in Fig. 2. Thus the part a to d of the profile rising gradually from a to b and falling abruptly from c to d can be angularly adjusted. The middle part of the eccentric shaft 1 carries the eccentric 36 surrounded by a bushing 37 and which drives the ram 21 through a connecting rod 38.

The structure operates as follows. To engage the coupling pressure is applied through the bore 31 to the coupling chamber C whereby the piston 20 and control rod 14 move to the right, Fig. 1. The levers 8 are rocked about their rollers as fulcrum held in the slots 6 to an extent corresponding to the travel of the heads 27, Simultaneously the pivots 9 and the plate support 10 shift to the left, Fig. 1, so that the coupling discs 13, 26 are pressed against the friction rings 3 which rotate continuously with the drive wheel 2. The coupling is then engaged and the eccentric shaft 1 driven by means of the disc 5. The ram 21 is moved downwardly from the illustrated uppermost position. Meanwhile the lever 15 turns in the direction of the arrow 39, its roll 33 rides over the low rise $a$ and $b$ on to the highest part $b$ and $c$ of the cam profile, which causes the lever 15 to rock on its pivot 16 in such a manner that the rod 14 is slightly thrust to the left against the pressure of the oil in chamber C, Fig. 1, which reduces the contact pressure of the discs 13 and 26 and thus the torque which the coupling can transmit. The highest profile portion $b$ and $c$ of the cam disc 17 then comes into action in the illustrated setting of the cam disc, when the ram approaches its lower reversal point, and operates until this point, and consequently the maximum working pressure of the tool are attained. On further rotation of the eccentric shaft the ram 21 moves upwardly, in Fig. 1, the roll 33 rides over the portion $c$ and $d$ of the cam profile 17 and on to its flat portion; the contact pressure therefore can be made effective again to its full extent.

In the diagram shown in Fig. 3, time is indicated by the direction of the arrow 40, and the stroke in the direction of the arrow 41. The time for one rotation is divided into six equal intervals and the position of the ram is shown. From this stroke-time curve it can be seen that the sections $a$, $b$ and $c$, $d$, of the cam profile are not symmetric to section $b$ and $c$. The reduction of the contact pressure begins at $a$ at about time 1.7, at half stroke height. It ends at $d$ at about time 3.8 after a quarter of the up-stroke has been traversed.

On rotation of the eccentric shaft in the direction of the arrow 43, Fig. 4, and downward travel of the ram in the direction of the arrow 44, the tangential force exerted by the eccentric shaft amounts to $Ta$ when the lever 15 is at $a$, to $Tb$ when it is at $b$. Owing to the lesser transmissible torque at position $b$, the force $Pb$ associated with the force $Tb$ and operating through the connecting rod, in the illustrated example, is of the same magnitude as the force $Pa$ associated with the force $Ta$ in position $a$. For braking, pressure is applied in chamber B whereby the coupling plates 26' are pressed against the lining 22.

A plurality of different cam discs 17 may be provided for one and the same machine to enable the power transmission in a work cycle to be varied in different patterns. Also the effect of the cam profile 17 at any instant of a revolution can be varied by shifting the profile parallel to the eccentric shaft, for which purpose it must be mounted on the machine frame with capacity for such shifting and fixation in any desired position. In the structure of Fig. 6 the cam disc 17 instead of being secured directly on the frame part 23, is adjustably secured on an intermediate member 43. The intermediate member 43 is provided with a cam member 44 on the side of the frame part 23, the wedge surface of which cooperates with a corresponding cam surface 45 of a ring disc 46. The ring disc 46 is provided with a handle grip 47 and is rotatable around the shaft 1. Securing screw bolts 48 are provided on the frame part 23 passing through bores 49 of the intermediate member 43 and through openings 50 in the ring disc 46. The intermediate member 43 is under the influence of springs 51 on the screws 48 with one end against the head of the screw and the other end against the member 43.

The overload safety coupling of this invention can be disposed in other locations in the drive of the machine, in which case modification will be necessary in the transmission of the control movements of the rod 14 to one coupling unit 10, 13 and 26. The control parts 15 and 17, may also be located differently from the example of Figs. 1 and 2.

In the modification shown in Fig. 5, the hollow rod 14 at its left hand end is screw threaded to receive a cap nut 45. A slide block 48 is arranged in a slot 47 in the rod 14 and a spring 46 is disposed between said block and the inside wall of the cap nut 45. The lever 15 is pivoted at 49 to the slide block 48. The profile cam 17 causes the spring 46 to be periodically tensioned by different amounts so that the pressure in the chamber C, and the contact pressure produced by the levers 8, are correspondingly reduced.

The invention is not limited to a machine of the kind described having a coupling operative as overload safety means; it can be used also in a machine with an overload safety means separate from the coupling, to enable the maximum force or torque to be transmitted by the overload safety means to be varied during a single working stroke.

I claim:

1. A drive with friction coupling and overload safety device for power-driven machines such as presses, shears, punches and the like, comprising a frame, a shaft with an eccentric rotatably mounted in the frame and having an axially directed bore therein, a drive means on one end of the shaft, a clutch coupling connected to the drive means and the shaft, a cam on the frame adjacent the other end of the shaft, and means extending through the bore and connected to contact the cam to regulate the clutch engagement in accordance with the rotary position of the shaft and controlled by the cam.

2. A drive with friction coupling and overload safety device according to claim 1, in which a fluid pressure actuated means is provided on the clutch end of the shaft and connected to the means extending through the bore of the shaft to actuate the clutch and provide for a driving connection between the shaft and the drive means.

3. A drive with friction coupling and overload safety device according to claim 1, in which lever arms are provided connected to the last-mentioned means and the clutch to transmit the regulating movement of said means as controlled by the cam.

4. A drive with friction coupling and overload safety device according to claim 1, in which the last-mentioned means is in the form of a rod extending through the bore of the shaft.

5. A drive with friction coupling and overload safety device for power-driven machines such as presses, shears, punches and the like, comprising a frame, a driven shaft rotatably mounted in the frame, a cam secured to the frame and mounted coaxially around the shaft near one end thereof, a movable coupling forming a disc clutch and mounted near the other end of the shaft, at least one mechanically operated member connected to the coupling and to the shaft near the said other end thereof, a periodically regulatable element mounted on the first-mentioned end of the shaft and provided with a roller to contact the cam, and means associated with the shaft connecting the mechanically operated member and said periodically regulatable element to regulate clutch engagement in accordance with the rotary position of the driven shaft, said regulatable element including a link with the roller thereon and pivotally mounted on the shaft and driven thereby to be actuated by the cam.

6. A drive according to calim 5, in which the drive shaft is hollow, and in which said means comprise a control rod extending through and axially shiftable in the hollow shaft.

7. A drive according to claim 5, in which the drive shaft is hollow, and in which said means comprise a control rod extending through and axially shiftable in the hollow shaft, and a fluid pressure operable means provided and connected to the control rod to actuate the coupling by means of the mechanically operated member.

(References on following page)

References Cited in the file of this patent

UNITED STATES PATENTS

| | | |
|---|---|---|
| 1,113,710 | Strand | Oct. 13, 1914 |
| 1,438,486 | Gorman | Dec. 12, 1922 |
| 1,472,411 | Fine | Oct. 30, 1923 |
| 1,608,778 | Dunwoodie | Nov. 30, 1926 |
| 1,870,226 | Bishop | Aug. 9, 1932 |
| 2,313,187 | Williamson | Mar. 9, 1943 |
| 2,532,266 | Andres | Nov. 28, 1950 |
| 2,600,667 | Mason | June 17, 1952 |
| 2,644,563 | Crary | July 7, 1953 |